United States Patent
Farrell et al.

(10) Patent No.: US 7,979,895 B2
(45) Date of Patent: Jul. 12, 2011

(54) SYSTEM AND METHOD FOR PARTITIONING A MULTI-LEVEL SECURITY NAMESPACE

(75) Inventors: Walter Bartlett Farrell, Woodstock, NY (US); Patrick Michael LiVecchi, Willow Spring, NC (US); Scott Christopher Moonen, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 990 days.

(21) Appl. No.: 11/840,212

(22) Filed: Aug. 16, 2007

(65) Prior Publication Data
US 2009/0049524 A1 Feb. 19, 2009

(51) Int. Cl.
*G06F 7/04* (2006.01)
(52) U.S. Cl. .......................................................... 726/4
(58) Field of Classification Search ........................ 726/4
See application file for complete search history.

(56) References Cited

U.S. PATENT DOCUMENTS

| 5,784,560 | A  | * | 7/1998 | Kingdon et al. | ............. 709/201 |
| 6,363,081 | B1 |   | 3/2002 | Gase           |                      |
| 2005/0097357 | A1 |   | 5/2005 | Smith        |                      |
| 2006/0074937 | A1 | * | 4/2006 | Bird et al.  | ..................... 707/100 |

OTHER PUBLICATIONS

"Comparing the Multilevel Security Policies of the Solaris Trusted Extensions and Red Hat Enterprise Linux Systems"; Glenn Faden, Feb. 2007 [http://www.sun.com/bigadmin/features/hub_articles/mls_trusted_exts.jsp].
United States Patent and Trademark Office, Office Action for U.S. Appl. No. 11/840,210, Aug. 19, 2010, pp. 1-13, Alexandria, VA, USA.
United States Patent and Trademark Office, Notice of Allowance for U.S. Appl. No. 11/840,210, Jan. 4, 2011, pp. 1-10, Alexandria, VA, USA.

* cited by examiner

*Primary Examiner* — Kambiz Zand
*Assistant Examiner* — Aubrey H Wyszynski
(74) *Attorney, Agent, or Firm* — Lee Law, PLLC; Christopher B. Lee

(57) ABSTRACT

The invention provides a system and method for "partitioning" a "namespace" managed by a name (or "directory") registration server according to "security label" or other security attributes to allow the same registered (e.g., "domain") name to be used for processing resource(s)/service(s)/application(s) operating under different security labels.

20 Claims, 3 Drawing Sheets

SYSTEM AND METHOD FOR PARTITIONING A MULTI-LEVEL SECURITY NAMESPACE

TECHNICAL FIELD

The invention relates to use of secure server applications on computer networks (including the internet).

BACKGROUND

A multi-level computer security system often identifies authorized system users as well as "user agents" and other computer system hardware and/or software resources using "security tags" (or "security labels") comprised of information access restrictions that can be organized into a data tuple (or similar data structure) containing the fields <security domain, security level, categories>. (See e.g., "*Federal Information Processing Standards Publication* 188"; 1994 Sep. 6, "Announcing the Standard for Standard Security Label for Information Transfer".) The "security domain" describes the domain of interpretation of the "security level" and "categories" values, while the "security level" identifies the restricted access (classification) level of a user or computer resource (e.g., "UNCLASSIFIED"/"CONFIDENTIAL"/"SECRET"/ "TOP SECRET") ordered according to increasing (or decreasing) security level values indicating more (or less) restrictive access for a given item of information (respectively), and the "categories" (a set of zero or more) identify additional non-hierarchical restrictions or characteristics applicable to a user or resource (e.g., membership in an organization or department such as DOD, DOE, NSA). The multi-level "security label" is a special case of a generalized "security descriptor" (which may be a single value such as a "security level" or which may consist of multiple such "security attributes") that is used to identify users and resources and determine appropriate use.

Two (or more) security labels are "equivalent" if they have the same "security tag" providing the same <security domain, security level, categories> restrictions, while security label "A" is said to "dominate" security label "B" in the same security domain if (1) the security level for "A" is equal to or higher than that of "B" and (2) all of the category restrictions identified for B are contained in (or are a subset of) the categories for A (where a given individual security label necessarily is equivalent to and/or dominates itself). A "range" of security labels from A to B may be defined if B dominates A (or vice versa) such that any security label "X" will fall within the range if it dominates security label "A" and is in turn dominated by security label "B" (or vice versa). In the generalized case, security descriptors can be defined to have a range.

SUMMARY OF THE INVENTION

The invention provides for extending the functioning of a system or network/internet name (or "directory") registration service to divide (or "partition") the allocated range of registered (e.g., "domain") names (or "namespace") according to "security label" or other security descriptor(s)/attribute(s) in multi-level security applications, so that a registration server can identify the "security label" of a system or network user client performing (or requesting resolution of) a name registration in order to: (a) distinguish the "security label" of a registered name in order to link (or "map") identification of associated system or network/internet processing resource(s)/service(s)/application(s) according to the corresponding operating range of "security labels"; and/or (b) identify a "security label" (in order to consult the corresponding "namespace partition") for a client requesting resolution (to locate a processing resource/service/application) by identifying the registered name. The invention thus allows a "namespace" managed by a name (or "directory") registration server to be "partitioned" by "security label" (where appropriate) but it also allows the same registered name to be used for processing resource(s)/service(s)/application(s) operating under different "security labels" and it provides administrative simplicity by requiring only a single registration service to perform these tasks.

The present invention provides a system and method for partitioning a namespace managed by a name (or "directory") registration server according to security label or other security descriptor(s)/attribute(s) to allow the same registered name to be used for processing resource(s)/service(s)/application(s) operating under different security labels.

The present invention provides for the use of secure server applications without requiring a different network or system name to be assigned by the name or directory registration server for each different server security label.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

BRIEF DESCRIPTION OF THE DETAILED DRAWINGS

DETAILED DESCRIPTION OF THE PREFERRED EMBODIMENTS

Figure 1:
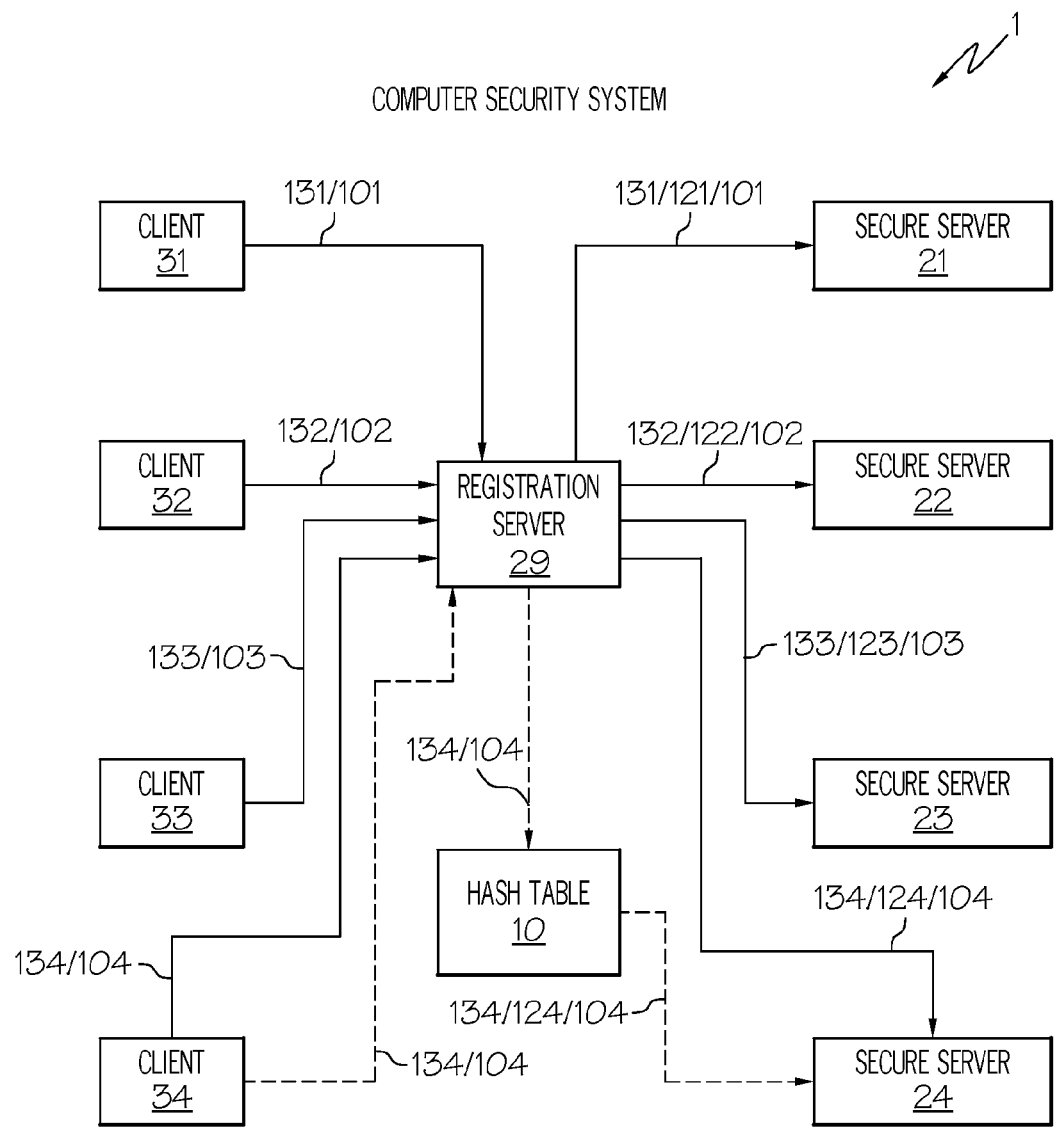
FIGS. 1 & 2 illustrate diagrams outlining operation of a multi-level computer security system according to the invention.

A multi-level computer security system has many authentication and authorization features and functions that are designed and configured to prevent "write-down" (or declassification) of data (occurring through access by unauthorized system users and/or resources at lower security levels or with incompatible security categories) which requires that (1) users and user agents can only provide (or "write") data to users, agents or other system resources having a dominating (equivalent or higher) security label; and (2) users and user agents may only access (or "read") data from users, agents or other system resources having a dominated (equivalent or lower) security label. Since computer network (including internet) client/server communications generally involve both "reading" and "writing" of data, both client and server must have equivalent security labels (or security descriptors) in order to operate together in a configuration that prevents "write-down" declassification of the data exchanged between them.

Computer system and/or network (including internet) name (or "directory") registration services allow user clients (and/or application programs) to identify the system or network/internet location (e.g., the numeric internet protocol IP addresses) of computer servers (or other processing applications and resources) based on a known "name" or "address" identification code (such as an internet "website address" or "domain name"). In some cases, the linking (or "mapping")

of a registered name to its associated processing resource is administratively defined (e.g., by use of a domain name service such as DNS) and in other cases it is maintained using "dynamic registration" functions, e.g., dynamic DNS, remote procedure calls (RPCBIND), object request broker (CORBA) or similar services.

A name (or "directory") registration service is presently capable of providing user (and user agent) clients with numeric "address" information (e.g., a file directory or IP address) to identify the system or network/internet location(s) of processing resources or resource "containers" (including server applications) that a client seeks to access in order to obtain data or processing action. In some cases, these identified processing resource(s) allow such access using a range of "security labels". However in some cases, different resource(s) must be prevented from accessing each other (by "partitioning") to effect a physical or electronic division or separation according to their respective security level(s). For example, an organization may have separate email servers for handling email message(s) classified with different security labels (e.g., UNCLASSIFIED-PUBLIC, CONFIDENTIAL-NSA, CONFIDENTIAL-DOD, SECRET-NSA, TOP SECRET-NSA). In such cases, the correct "mapping" of a registered name (to identify the numeric "address" of a processing resource or application) depends upon the "security label" of the requesting client.

FIGS. 1-2 & 3-4 respectively illustrate diagrams and flowcharts outlining operation of a multi-level computer security system 1 according to a preferred embodiment of the invention, where a data storage or processing hardware and/or software container resource (e.g., a computer file/database or disk drive directory or an internet protocol (IP) address) may be configured to allow access to information falling within a range of potential security labels. When a discrete resource is accessed or created (i.e., "instantiated") from within (or using) a given container (e.g., opening a file or software application program or establishing a transmission control protocol (TCP) connection using an IP address or sending a user datagram protocol (UDP) message using a TCP/IP address and port connection) that resource will inherit the security label of the user (or agent) creating it and it must contain or use data that falls within the range of security attributes allowed for storage or processing in that container (i.e., 101 and/or 102 and/or 103 and/or 104 respectively corresponding to "UNCLASSIFIED-PUBLIC"/"CONFIDENTIAL-NSA"/"SECRET-NSA"/"TOP SECRET-NSA", etc.)

Similarly in certain multi-level security implementations, a generic server (or "daemon") software application program may be identified as a processing resource "container" 20 of the software "user agents" it creates and therefore may be configured to operate within a defined set of potential security attributes 100 when instantiating "user agent(s)" for carrying out the processing function(s) requested by one or more system user(s), which must also inherit the security label of the user (or other agent) initiating the transaction that falls within the range of security labels permitted to be accessed on the server (when a user request or transaction is executed by that server). A server application permitted to use such a range of potential security labels may communicate via (or "bind to") a TCP/IP address/port that is associated with the same range if the system properly identifies (or "tags") the security label 130 of a network client 30 making a processing request to that server 20 and if the server has a consistent (i.e., equivalent or dominating) security label 120 so it can validly "assume" the restrictions contained in the client security label in order to service a processing transaction for that client.

However, it may be costly (or impossible) to modify (or "retrofit") an existing server software application to correctly identify and assume the security label of every potential client capable of making a processing request, so in that case the server must operate using one specific security label (i.e., as a single level security (SLS) application) such that it is only permitted to provide processing service(s) to client(s) having an equivalent security label. As a result, additional (duplicate) instances of the processing function(s) for that server application (21 or 22 or 23 or 24) must be initiated (or "launched") to provide service to multiple clients (31 or 32 or 33 or 34) having security labels (131 or 132 or 133 or 134) with different security levels and/or categories and/or other attributes (101 or 102 or 103 or 104 respectively).

In the situation described above, a system or network name (or "directory") registration service 29 can identify separate processing resources 20 according to security label 120 in the following manner: (i) a resource operating with different security labels may be registered in different names, e.g., [imap-confidential.dod.mil] and [imap-secret.dod.mil]; and/or (ii) the registration service may itself be partitioned by security label. For example, different DNS server(s) may exist for handling "domain name"/"website address" registrations/resolutions for internet "web server(s)" configured to operate with different security labels (e.g., UNCLASSIFIED-PUBLIC, CONFIDENTIAL-NSA, CONFIDENTIAL-DOD, SECRET-NSA, TOP SECRET-NSA, etc.). However these alternatives each have drawbacks since in some cases (i) the registered name to be used for a processing resource is "well-defined" (and therefore cannot vary) including for RPC applications such as network file system (NFS) which must enter a registration name using a "well-known program number"; and (ii) administrative complexity is introduced if a large number of security labels are used (each requiring a separate registration server) which also introduces additional client configuration complexity (since the client must determine the proper registration service to be used in locating the identified processing resource).

Figure 2:
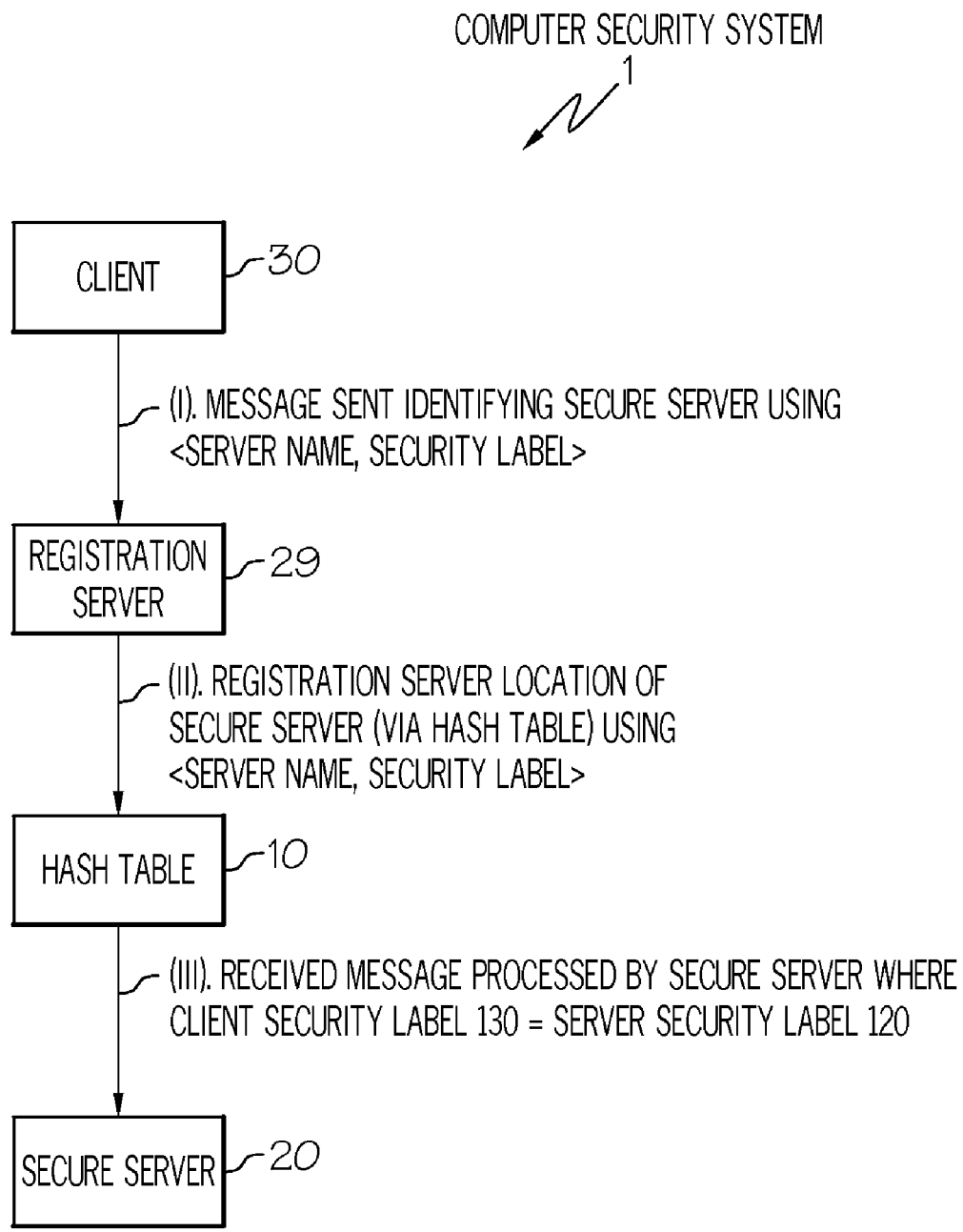
Figure 3:
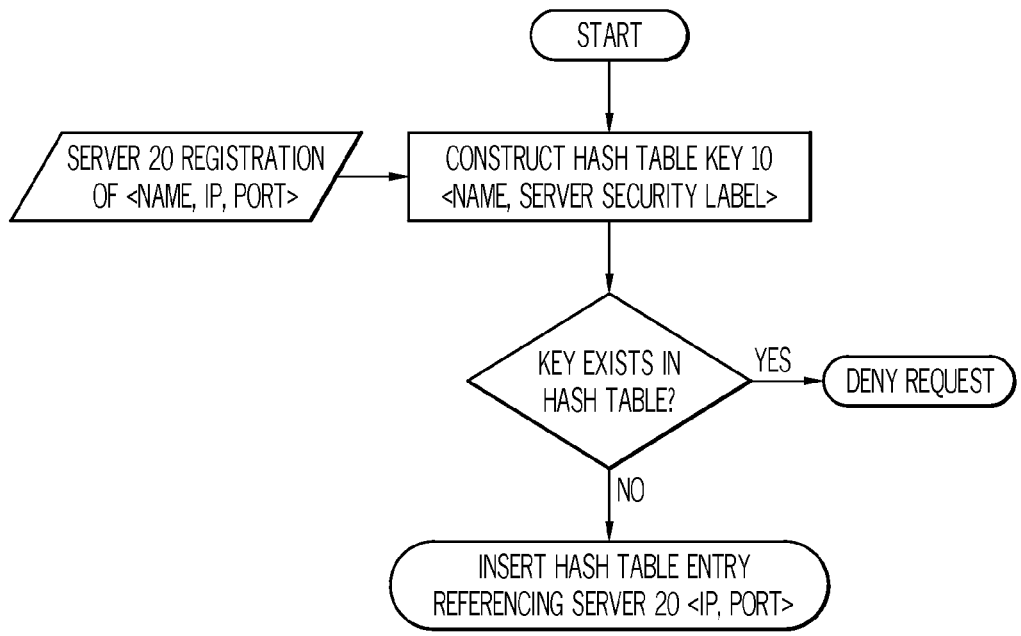
FIGS. 3 & 4 illustrate flowcharts outlining operation of a multi-level computer security system according to the invention.
Figure 4:
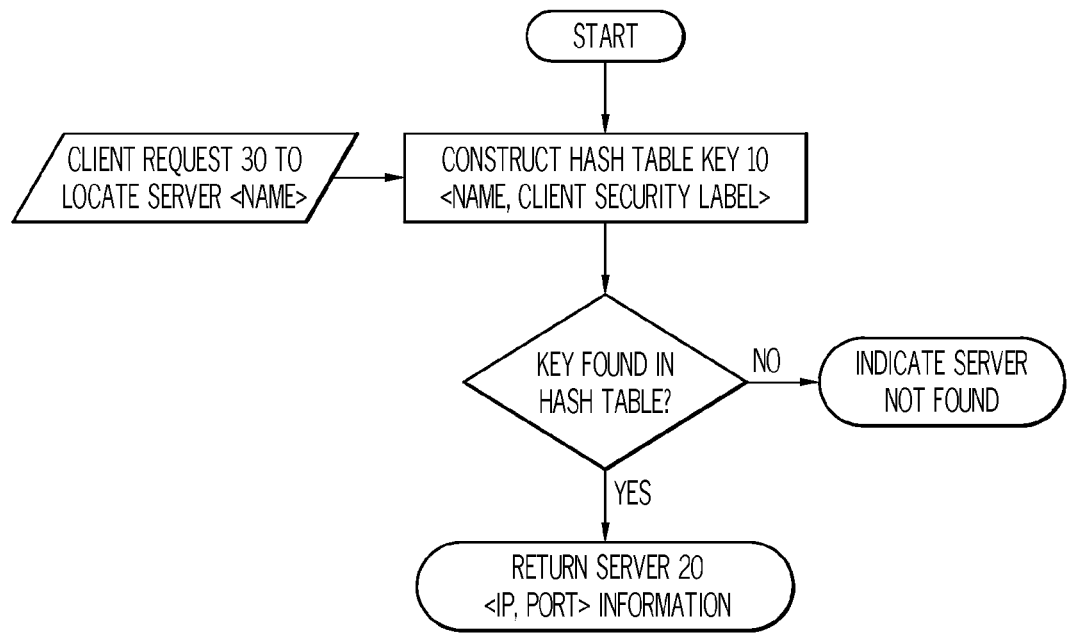

Numerous data structures may be (optionally) selected depending on the existing internal configuration of a name (or "directory") registration service to be used in implementing the invention. As shown in FIGS. 1 & 2, many name (or "directory") registration server implementations 29 (such as DNS and RPCBIND) employ a data structure such as a "hash table" 10 to link (or "map") the identification of an operating server application 20 to the associated network/internet (TCP/IP) address(es)/port(s) used by that server in communicating with network client(s) 30. As shown in FIGS. 3 & 4 respectively illustrating the "registering" of a server 20 and the processing of a given client request 30 for server identification, the "hash table" 10 is consulted to determine the network/internet location of the server or resource 20 corresponding to the (e.g., domain) name for that server or resource contained in the request. As shown in FIG. 2 step (i) & (ii), a preferred embodiment of the invention extends the "hash table lookup" to include an identification of the "security label" as well as the server or resource name identified in the client request so that (conceptually) the "hash table key" 10 used in identifying the appropriate server 20 for processing the client request 30 now consists of <name, security label> rather than <name>.

For example, the registration server 29 may use a "hash table" 10 by introducing the "security label"<security domain, security level, categories> as part of the "hash table key" in order to link (or "map") the system or network/internet (IP) address location of the identified processing resource/service/application 20 with its registered (e.g.

"domain") name as well as its operating security label(s)/level(s) 120 as shown in FIG. 2 step (iii). For example, a multi-level security DNS server may be configured to use a separate "zone file" (or an RPCBIND or CORBA server may maintain separate internal registrations) for each possible client security label (or other security descriptor) to be used in accessing a registered website or application server. Alternatively, the "hash table" may be modified to implement a list (or "chain") of such tables (indexed by security label). In addition, the "name registration objects" indexed by a "hash table" may be replaced by a list (or "chain") of one or more such objects (each identified with a specific security label) and other known data structures may be used to achieve the same purpose. In particular, alternative security descriptors may be created that are broader than the multi-level security label described herein (e.g., having additional attributes) or narrower (e.g., consisting only of a security level attribute) for which it remains possible to define permitted ranges or sets of security descriptors.

While certain preferred features of the invention have been shown by way of illustration, many modifications and changes can be made that fall within the true spirit of the invention as embodied in the following claims, which are to be interpreted as broadly as the law permits to cover the full scope of the invention, including all equivalents thereto.

What is claimed is:

1. A computer system, comprising:
   a registration server configured for identifying at least one secure server that is used for receiving and processing one or more client messages by linking a known secure server name supplied by a client within each client message to an address identifying a network location of the at least one secure server and at least one security attribute for each client message;
   wherein one of multiple instances of a secure server application is used for processing the one or more of the client message(s) through use of partitioned name(s) managed by the registration server so that a same secure server name is used for processing client message(s) comprising different security attribute(s).

2. The computer system of claim 1, wherein each client message inherits a client security label and contains data falling within a range of security levels processed by one of the at least one secure server.

3. The computer system of claim 2, wherein the at least one secure server communicates with the client via a single internet protocol address and port comprising a same range of security levels used by the at least one secure server.

4. The computer system of claim 3, wherein each of the at least one secure server operates at a single security level to process client message(s) comprising an equivalent client security label.

5. The computer system of claim 4, wherein multiple instances of the secure server application are initiated, each comprising a server security label in a specified range of security levels, to process multiple client messages each comprising the client security label in the specified range of security levels.

6. The computer system of claim 1, wherein the registration server is further configured to use a data table to identify each of the multiple instances of the secure server application by the same secure server name and a different server security label.

7. The computer system of claim 6, wherein the data table is formatted in an anchor data structure that identifies a chain list of the multiple instances of the secure server application each using the same secure server name such that each of the multiple instances of the secure server application is associated with the different server security label.

8. The computer system of claim 1, wherein the registration server identifies a server security label to distinguish a secure server according to a security level.

9. The computer system of claim 8, wherein a client security label is used to locate the secure server by identifying the secure server name.

10. A method, comprising:
    configuring a registration server for identifying at least one secure server that is used for receiving and processing one or more client messages by linking a known secure server name supplied by a client within each client message to an address identifying a network location of the at least one secure server and at least one security attribute for each client message;
    wherein one of multiple instances of a secure server application is used for processing the one or more of the client message(s) through use of partitioned name(s) managed by the registration server so that a same secure server name is used for processing client message(s) comprising different security attribute(s).

11. The method of claim 10, wherein each client message inherits a client security label and contains data falling within a range of security levels processed by one of the at least one secure server.

12. The method of claim 11, wherein the at least one secure server communicates with the client via a single internet protocol address and port comprising a same range of security levels used by the at least one secure server.

13. The method of claim 12, wherein each of the at least one secure server operates at a single security level to process client message(s) comprising an equivalent client security label.

14. The method of claim 13, wherein multiple instances of the secure server application are initiated, each comprising a server security label in a specified range of security levels, to process multiple client messages each comprising the client security label in the specified range of security levels.

15. The method of claim 10, further comprising configuring the registration server to use a data table to identify each of the multiple instances of the secure server application by the same secure server name and a different server security label.

16. The method of claim 15, wherein the data table is formatted in an anchor data structure that identifies a chain list of the multiple instances of the secure server application each using the same secure server name such that each of the multiple instances of the secure server application is associated with the different server security label.

17. The method of claim 10, wherein the registration server identifies a server security label to distinguish a secure server according to a security level.

18. The method of claim 17, wherein a client security label is used to locate the secure server by identifying the secure server name.

19. The computer system of claim 1, where the registration server is configured to manage the partitioned name(s) using a plurality of server security labels.

20. The method of claim 10, further comprising configuring the registration server to manage the partitioned name(s) using a plurality of server security labels.

* * * * *